(12) United States Patent
Verschueren

(10) Patent No.: US 7,176,406 B2
(45) Date of Patent: Feb. 13, 2007

(54) DEVICE FOR CUTTING MATERIAL BY MEANS OF A LASER BEAM

(75) Inventor: Dirk Emiel Jozef Verschueren, Kontich (BE)

(73) Assignee: Bettonville, naamloze vennootschap (BE)

(*) Notice: Subject to any disclaimer, the term of this patent is extended or adjusted under 35 U.S.C. 154(b) by 0 days.

(21) Appl. No.: 11/345,305

(22) Filed: Feb. 2, 2006

(65) Prior Publication Data

US 2006/0196860 A1 Sep. 7, 2006

(30) Foreign Application Priority Data

Mar. 4, 2005 (EP) ................... 05075533

(51) Int. Cl.
*B23K 26/38* (2006.01)
*B23K 26/06* (2006.01)

(52) U.S. Cl. .............. 219/121.67; 219/121.7; 219/121.73

(58) Field of Classification Search ........... 219/121.67, 219/121.73, 121.7, 121.71, 121.75
See application file for complete search history.

(56) References Cited

U.S. PATENT DOCUMENTS

| | | | | |
|---|---|---|---|---|
| 4,547,651 A | * | 10/1985 | Maruyama | 219/121.67 |
| 6,130,403 A | * | 10/2000 | Wakabayashi | 219/121.73 |
| 6,518,543 B1 | * | 2/2003 | Benz et al. | 219/121.73 |
| 2002/0158052 A1 | * | 10/2002 | Ehrmann et al. | 219/121.73 |

FOREIGN PATENT DOCUMENTS

| | | | |
|---|---|---|---|
| JP | 63-10093 A | * | 1/1988 |
| JP | 4-270091 A | * | 9/1992 |

* cited by examiner

*Primary Examiner*—Geoffrey S. Evans
(74) *Attorney, Agent, or Firm*—Bacon & Thomas PLLC

(57) ABSTRACT

Device for cutting material by a laser beam, which device (1) comprises a laser source (2) for generating a laser beam (3) with an optical axis (10) and a focusing lens (8) for focusing said beam (3), characterized in that between said laser source (2) and said focusing lens (8) are provided a first and a second retardation plate (4 and 5) and a refraction element in between them, which is provided rotatable and tiltable with respect to said optical axis (10) of the incoming light beam.

7 Claims, 1 Drawing Sheet

DEVICE FOR CUTTING MATERIAL BY MEANS OF A LASER BEAM

BACKGROUND OF THE INVENTION

1. Field of the Invention

The present invention relates to a device for cutting material by means of a laser beam.

More specifically the present invention relates to a device for cutting material by means of a laser beam, which device comprises a laser source for generating a laser beam and a focusing lens for focusing said laser beam onto said material.

2. Discussion of the Related Art

Known devices are provided with a mirror for redirecting the beam coming from said laser source to said lens, whereby said mirror is moved back and forth in the longitudinal direction of the optical axis of the device.

As a result thereof, a back and forth movement of the laser beam in a transversal direction is realized onto a focusing lens which focuses the beam onto a material which needs to be cut, such as for example a gemstone, thereby continuously changing the angle of incidence onto this material.

By moving the material, a cut is created therein.

A disadvantage of such known devices is that the laser beam creates a V-shaped cut in the material and that it does not allow to make a cut with sides which are parallel with the optical axis of the device.

Another disadvantage of such known devices is that, due to the constant motion of the mirror, these devices can easily break down because of failure of one of the constantly moving parts.

SUMMARY OF THE INVENTION

The present invention aims at a laser device for cutting material, which device does not show the above and other disadvantages.

To this aim, the invention relates to a device for cutting material by means of a laser beam, which device comprises a laser source for generating a laser beam and a focusing lens for focusing said beam whereby, between said laser source and said focusing lens are provided a first and a second retardation plate and a refraction element in between them, which is provided rotatable and tiltable with respect to the optical axis of the incoming light beam.

An important advantage of a device according to the invention is that, by controlling the movement of the refraction element, the laser beam can be directed in any desired position for cutting a material, such that it enables to create cuts of which the sides are parallel with respect to the longitudinal direction of the optical axis.

Another advantage of a device according to the invention is that the tilting and rotating of said refraction element is not a continuously repeated movement and can be executed in an almost unlimited scope of different directions, such that there is less wear of the moving parts than with the known devices.

BRIEF DESCRIPTION OF THE DRAWINGS

With the intention of better showing the characteristics of the invention, hereafter, as an example without any restrictive character whatsoever, some preferred forms of embodiment are described, with reference to the accompanying drawings, wherein.

DESCRIPTION OF THE PREFERRED EMBODIMENT

Figure 1:
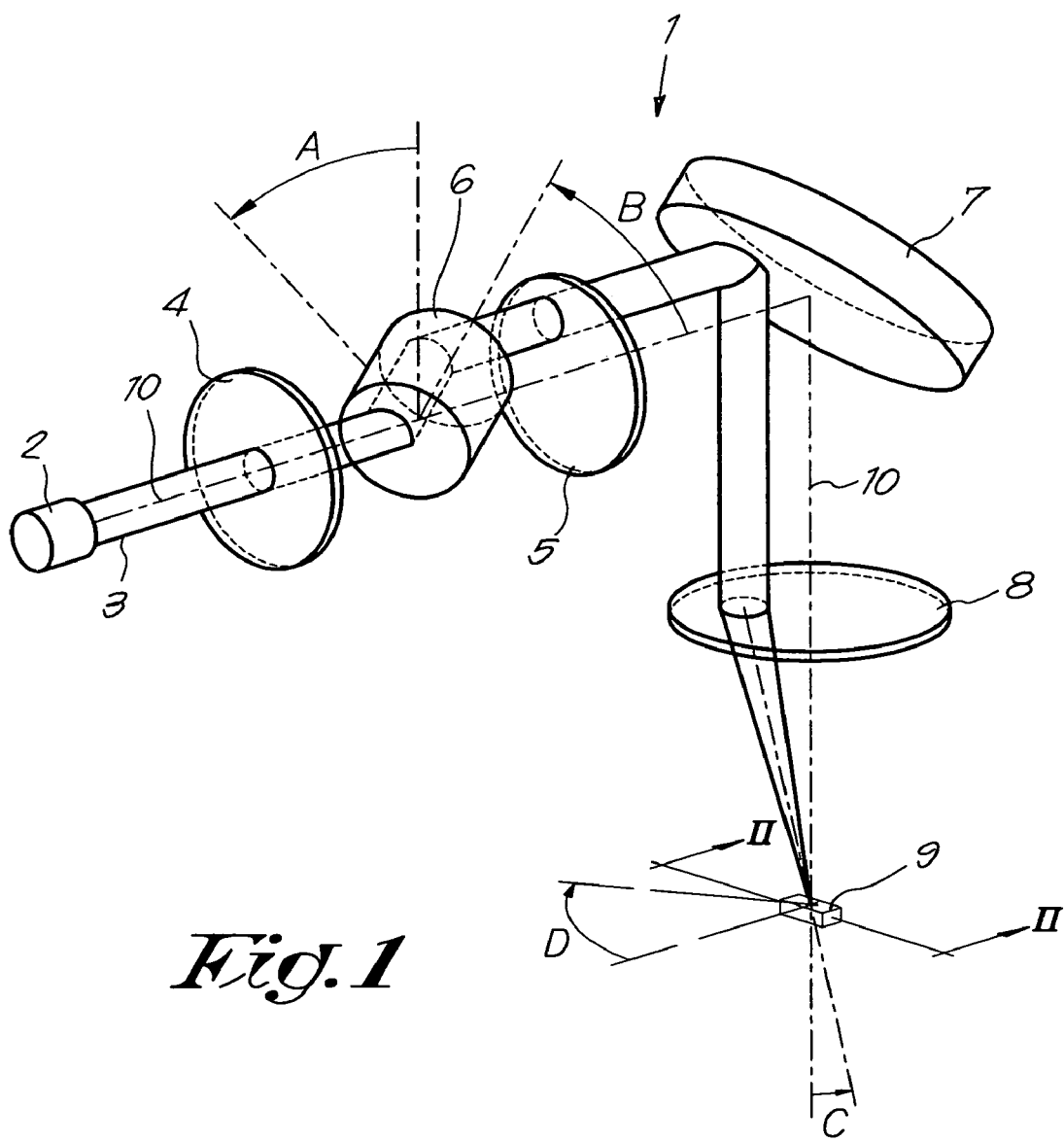
FIG. 1 schematically represents a device according to the invention.

FIG. 1 represents a device 1 according to the invention, which device 1 mainly consists of a laser source 2 which is suitable of generating a high energy, linearly polarized laser beam 3.

An example of such a laser source 2 is a YAG laser.

In the optical path of said laser beam a first and a second retardation plates 4 and 5 respectively are placed, which, in this case, both consist of a so-called quarter lambda (or quarter wavelength) plate.

Such quarter lambda plates are known in the art and exist for example of two pieces of quartz crystalline material, cemented with their optic axes perpendicular to each other.

Between said retardation plates 4 and 5 a refraction element is mounted, which, in this case, consists of a transparent cylinder 6 and which is provided rotatable and tiltable with respect to the optical axis of the incident light by means of any control and drive mechanism.

In this case said cylinder 6 is made of glass, such as for example soda-lime-silica glass, so-called flint glass containing lead oxide or barium oxide glass.

It is clear that, as an alternative to these silica based glasses, other bases can be used such as boron oxide, phosphorus pentoxide and germanium oxide.

In this case the device 1 is additionally provided with a mirror 7 which is placed after said second retardation plate 5.

Finally, a device 1 according to the invention, is provided with a focusing lens 8 for focusing the laser beam 3 onto a material 9 which needs to be cut, such as for example a gemstone or the like.

The functioning of a device 1 according to the invention is as follows.

The laser source 2 generates a high energy, linearly polarized laser beam 3 with an optical axis 10.

As said laser beam 3 crosses the first retardation plate 4, which in this case consists of a quarter lambda plate, it becomes circularly polarized.

Subsequently, the light goes through said glass cylinder 6.

As said cylinder 6 is rotated around the optical axis 10 over an angle A and tilted over an angle B with respect to said optical axis 10, said light beam 3 is diffracted.

The outgoing light beam is directed to said second retardation plate 5, which turns the circularly polarized light back into linearly polarized light.

After the laser light has passed the second retardation plate 5, it reaches said mirror 7 and becomes redirected towards said focusing lens 8, which converges said beam towards the material 9 which needs to be cut.

By rotating and/or tilting said cylinder 6, the orientation of the incident light with respect to said material 9 can be changed.

This enables to make cuts into the material 9, of which the side walls 11 can have different inclinations with respect to the optical axis 10 of the cutting device 1 and can even be parallel with this axis 10, on one or several sides of the initially V-shaped cut.

In FIG. 1 is shown that said incident light is tilted over an angle C with respect to the optical axis 10, which depends on the tilting angle B of said cylinder 6.

Also said laser beam 3 is rotated over an angle D with respect to the surface defined by the optical axis 10, which angle equals, in this case, the rotational angle A of said cylinder 6.

Figure 2:
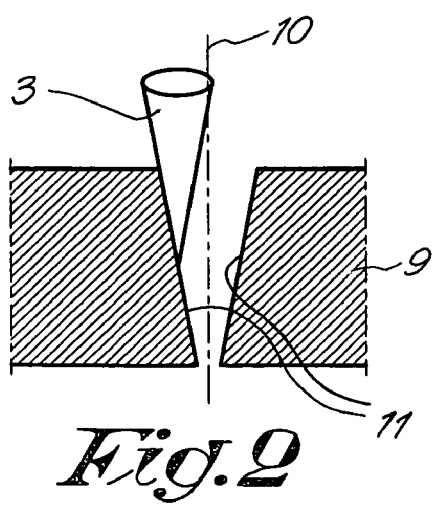
FIG. 2 represents on a larger scale a cross-section as indicated by line II—II in FIG. 1.
Figure 3:
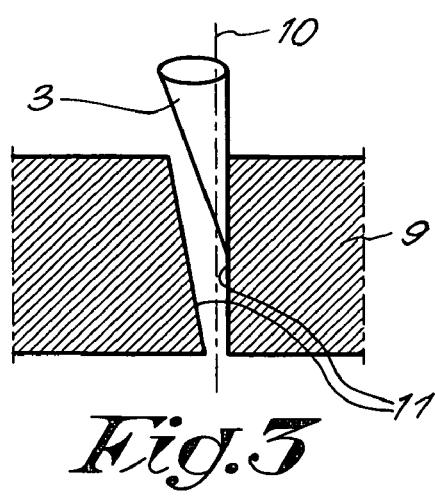
FIG. 3 represents a view according to FIG. 2, for a different orientation of the laser beam.

FIGS. 2 and 3 represent different orientations of the incident laser beam 3 cutting in said material 9.

In a preferred form of embodiment said second retardation plate 5 can be rotated around the optical axis 10, such that the polarization of the outgoing light can be changed by rotating said retardation plate 5.

It is clear that said cylinder 6 must not necessarily be made of glass, as it can also be made of a synthetic and transparent material, such as for example polystyrene.

The present invention is in no way limited to the embodiments described above and represented in the drawings, but such a device 1 for cutting material 9 by means of a laser beam 3 may be realized in different shapes and dimensions, without departure from the scope of the invention.

The invention claimed is:

1. A device for cutting material by a laser beam, which device comprises a laser source for generating a laser beam with an optical axis and a focusing lens for focusing said beam, wherein, between said laser source and said focusing lens are provided a first and a second retardation plate and a refraction element in between them, said refraction element being rotatable and tiltable with respect to said optical axis of the incoming light beam.

2. The device according to claim 1, wherein said device is additionally provided with a mirror which is situated between said second retardation plate and said focusing lens.

3. The device according to claim 1 wherein that said retardation plates are quarter wavelength plates.

4. The device according to claim 1, wherein said refraction element consists of a transparent cylinder (6).

5. The device according to claim 4 wherein said cylinder is made of glass.

6. The device according to claim 1, wherein said second retardation plate is provided rotatable around said optical axis.

7. The device according to claim 1 wherein said focusing lens can be moved in the longitudinal direction of the optical axis.

* * * * *